United States Patent [19]
Siegel

[11] 3,742,969
[45] July 3, 1973

[54] PNEUMATIC FORCE-BALANCE TRANSMITTER

[75] Inventor: William A. Siegel, Norristown, Pa.
[73] Assignee: Fischer & Porter Company, Warminster, Pa.
[22] Filed: Dec. 27, 1971
[21] Appl. No.: 212,585

[52] U.S. Cl. ................................. 137/85
[51] Int. Cl. .................... F15b 5/00, G05d 16/00
[58] Field of Search ................... 137/55, 80, 84, 82

[56] References Cited
UNITED STATES PATENTS

| | | | |
|---|---|---|---|
| 2,360,889 | 4/1945 | Phillbrick | 137/86 X |
| 3,602,242 | 8/1971 | Mott | 137/85 |
| 2,356,970 | 8/1948 | Brockett | 137/85 UX |
| 2,986,151 | 5/1961 | Shannon | 137/85 |
| 3,008,480 | 11/1961 | Fleming | 137/85 |
| 3,297,045 | 1/1967 | Beach | 137/85 |
| 3,132,661 | 5/1964 | Flesor | 137/85 |

Primary Examiner—Alan Cohan
Attorney—Michael Ebert

[57] ABSTRACT

A pneumatic force balance transmitter in which an input force proportional to the fluid flow rate being measured is applied to a force bar pivoted about a transverse axis to produce a torque. A rebalance torque is applied to the bar by means of a negative feedback loop, in which a pneumatic detector functions to sense any change in bar position, the detector output being amplified to produce a pneumatic output signal that is fed to a bellows assembly to impose a feedback force on the bar in opposition to the input force to an extent tending to hold the bar motionless. The bellows assembly is constituted by a small bellows nested within a larger bellows whereby the feedback force developed by the assembly may be selectively changed in large steps by feeding the output signal either to the small or the large bellows or to both, thereby to effect a coarse change in the operating range of the instrument.

8 Claims, 2 Drawing Figures

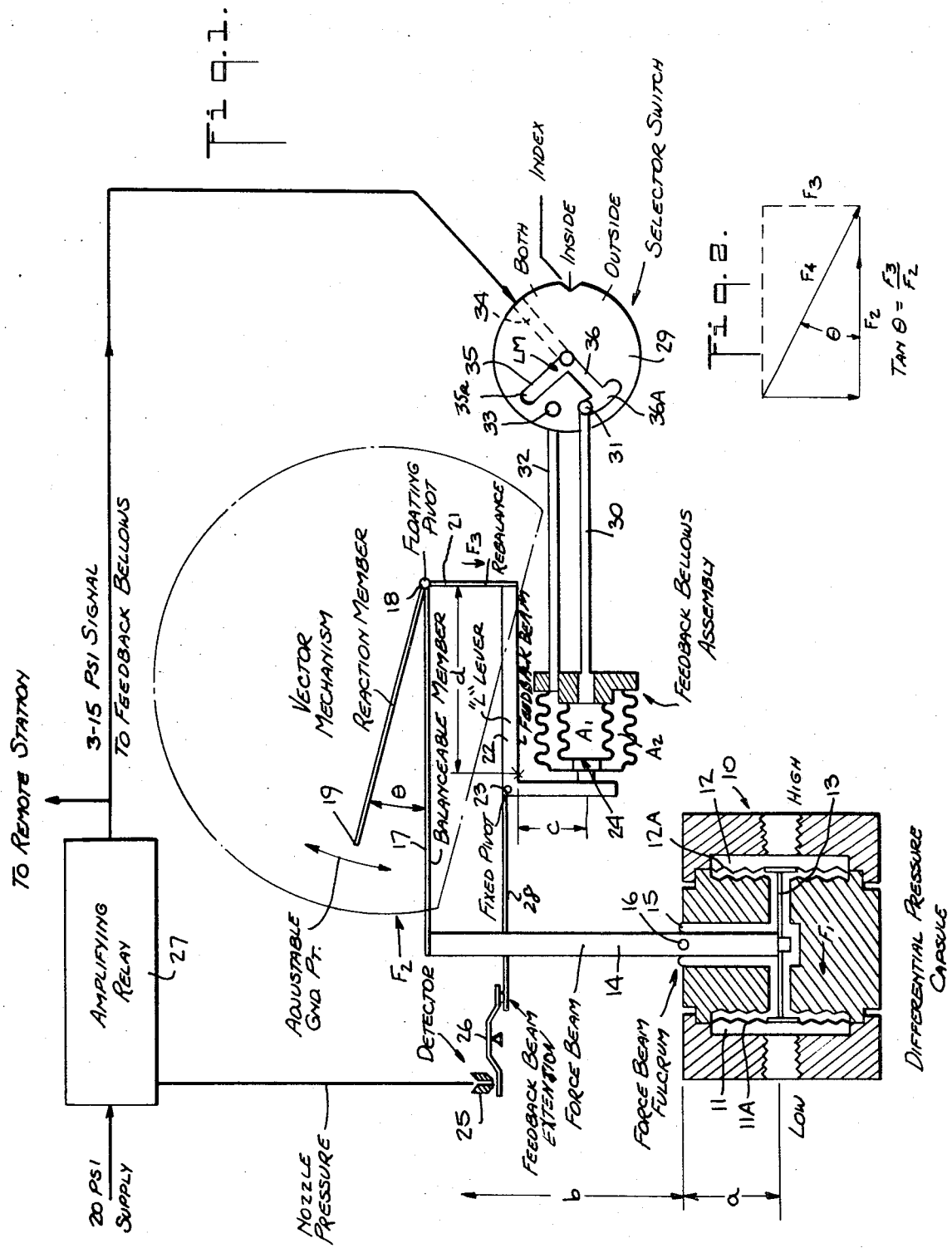

PNEUMATIC FORCE-BALANCE TRANSMITTER

BACKGROUND OF THE INVENTION

This invention relates generally to pneumatic pressure measuring instruments, and more particularly to an improved transmitter of the force balance type incorporating mechanisms to effect both fine and coarse changes in the range of the instrument.

One important application of the force balance principle is in the differential pressure flow transmitter. In a transmitter of this type, an elongated force bar is pivoted about a transverse axis. An input force derived from a differential pressure capsule and corresponding to the flow rate of the fluid to be measured, is applied to the force bar to produce a torque about its fulcrum. Also applied is a rebalance torque which tends to hold the bar motionless.

The rebalance torque is developed by a negative feedback loop that includes a detector to sense any slight change in force bar position due to an unbalance of torques. The detector directs a corresponding feedback signal to a feedback motor that applies to the force bar a force in opposition to the input force. This feedback signal is maintained proportional to the flow rate being measured and is used therefore to produce an output signal for transmission to a remote control station or to an indicating or recording device.

In a force-balance instrument of the electrical type, the feedback system is provided with an electric motor and the output signal is electrical in nature, whereas in the pneumatic type, the motor is in the form of a pneumatically actuated bellows and the output signal which is applied to the bellows is fluidic in nature.

In a force-balance transmitter, there is virtually no movement of the force bar over the full-scale range of operation. This virtual absence of movement is highly advantageous, for it effectively eliminates hysterisis and other errors of the type encountered in so-called motion-balance instruments. On the other hand, existing instruments suffer from certain drawbacks which have somewhat limited their applicability. For example, prior instruments are excessively sensitive to positional orientation and vibration. Also, with existing instruments, friction at contact points gives rise to inaccuracies.

In a force balance instrument, it is important to be able to change the operating range of the instrument. In an instrument of the type disclosed in U.S. Pat. No. 3,564,923, in which the feedback system is electrical in nature and employs a feedback motor, the force balance mechanism includes a vernier range-changing structure in the form of a flexured reaction member and a rotatable support element adapted to change range without altering the static balance of the instrument.

However, in this patent, in order to effect relatively large changes in range, the winding of the motor is split into sets which are selectively connected so as to alter the effective number of turns and thereby bring about step changes in the force developed by the motor armature.

But an equivalent expedient is not presently available in force-balance instruments of the pneumatic type in which the feedback system employs feedback bellows. With conventional feedback bellows, one cannot effect step changes in the force developed thereby to produce coarse changes in the range of the instrument.

SUMMARY OF THE INVENTION

In view of the foregoing, it is the main object of this invention to provide an improved pneumatic force-balance transmitter whose range may be changed in relatively large steps as well as continuously in a vernier action.

Also, an object of this invention is to provide a force balance transmitter which has a large operating range, and which makes use of a beam system of reduced mass wherein friction contact points are eliminated.

Yet, another object of the invention is to provide an accurate force-balance transmitter which is substantially insensitive to changes in orientation and vibratory forces.

Briefly stated, these objects are accomplished in a force-balance instrument in which an input force proportional to the rate of fluid flow or other factor being measured, is applied to a pivoted force bar to produce a torque about its fulcrum, a negative feedback loop cooperating with the bar and functioning to apply a rebalance torque thereto to an extent tending to hold the bar motionless.

In the feedback loop, a pneumatic detector serves to sense any change in force bar position, the detector output being amplified to produce a pneumatic output signal which is fed to a bellows assembly adapted to apply a feedback force to the bar in opposition to the input force. The feedback bellows assembly is constituted by a small bellows concentrically nested within a larger bellows whereby the force produced by the assembly can be selectively changed by applying the output signal to either the small or the large bellows, or to both bellows.

In a preferred embodiment of the force transmitter, the force bar and the negative feedback loop are intercoupled by a vector mechanism including a balanceable member extending horizontally between the upper end of the vertically-mounted force bar and a floating pivot. A downward force is applied to the floating pivot by a lever coupled to the bellows assembly, the downward force counteracting the input force applied to the bar which tends to force the floating pivot upwardly.

Extending between the floating pivot and a ground point is a reaction element, the angle between the reaction element and the balanceable member being continuously adjustable to effect small changes in the range of the transmitter. The bellows assembly lever is joined to a feedback beam on whose end is mounted the flapper of a flapper-nozzle detector, the output of the detector being fed to an amplifying relay to produce an output signal which goes to a remote recording or indicating station as well as to the bellows assembly.

OUTLINE OF THE DRAWING

For a better understanding of the invention as well as other objects and further features thereof, reference is made to the following detailed description to be read in conjunction with the accompanying drawing, wherein:

FIG. 1 is a schematic diagram of a pneumatic force-balance transmitter in accordance with the invention; and FIG. 2 is a vector diagram of certain forces developed in the instrument.

DESCRIPTION OF THE INVENTION

Referring now to FIG. 1, a pneumatic force-balance transmitter is illustrated which includes a differential pressure-responsive capsule, generally designated by numeral 10. Capsule 10 is provided with a pair of identical pressure chambers 11 and 12 having thin corrugated metal diaphragms 11A and 12A mounted therein.

In practice, these chambers are coupled to suitable pipes carrying fluid under pressure, the ends of the pipes being connected upstream and downstream of an orifice plate inserted in a pipe line, so that the differential pressure between the two pipes is proportional to the rate of fluid flow through the line. The transmitter may therefore be mounted directly on the pipe line at a point remote from a central control station where the measurement data is sent in the form of a pneumatic signal.

Diaphragm 11A and 12A are joined together in the capsule by a horizontal link 13 whose midpoint is attached to the lower end of an elongated force beam 14, pivotally supported in a vertical position by a seal diaphragm 15. Because of the difference between the low and high fluid pressures applied to the pressure responsive diaphragms, link 13 tends to shift leftward to an extent depending on this difference, thereby applying a force $F_1$ to the lower end of force beam 14.

Force $F_1$ causes beam 14 to swing in a clockwise direction about its fulcrum 16 to produce a rightwardly directed force $F_2$ whose strength depends on the lever ratio $a/b$ of the bar. In this lever ratio, the value $a$ is the distance between the lower end of beam 14 and its fulcrum 16, and the value $b$ is the distance between the fulcrum and the upper end of the bar.

Force $F_2$ which is proportional to the applied differential pressure is imposed on one end of a horizontally-extending balanceable member 17 of a vector mechanism, the other end of member 17 terminating in a floating pivot 18. Extending between floating pivot 18 and an adjustable ground point 19 and secured thereto by suitable flexible connections or hinges is a reaction element 20. The adjustable angle existing between balanceable member 17 and reaction element 20 is represented by symbol $\theta$.

The upward component of motion of balanceable member 17 due to the horizontally-directed input force $F_2$ applied thereto is opposed by a downwardly-directed rebalancing force exerted by a flexible strip 21, the upper end of which is attached to floating pivot 18. The lower end of strip 21 is connected to the long arm of an L-shaped lever 22 which is swingable about a fixed pivot 23 and functions as a feedback beam. The short arm of lever 23 is operatively linked to a feedback bellows assembly, generally designated by numeral 24.

The downward force applied to floating pivot 18 by rebalance strip 21 is maintained at the correct magnitude by a negative feedback arrangement that includes a flapper-nozzle pneumatic detector constituted by a bleed nozzle 25 and a flapper 26 cooperating therewith.

Nozzle 25 is coupled to an amplifying relay 27 operated from an air supply (i.e., 20 p.s.i.) whose output signal has a pressure level which is reversely related to the distance between the nozzle and flapper. That is, when the flapper is lifted away from the nozzle (movement is actually not more than a few thousandths of an inch) nozzle pressure drops, causing the relay 27 to decrease the pressure of its output signal (3 to 15 p.s.i.). Thus, the flapper nozzle detector functions to sense any slight change in the force bar position due to an unbalance of torques.

Flapper 26 is pivotally supported from a ground point and is coupled to the free end of a feedback beam extension 28, whose other end is secured to the L-shaped lever 22 forming the feedback beam, the feedback beam extension being in line with the long arm of the lever. Thus, when bellows assembly 24, which produces the feedback force, causes lever 22 to swing in the clockwise direction to pull down rebalance strip 21, feedback beam extension 28 is simultaneously caused to swing up to increase the distance between flapper 26 and nozzle 25.

The output signal from amplifying relay 27 is fed to the feedback bellows assembly through a selector switch 29 whose setting determines the operative state of the assembly and the strength of the feedback force developed thereby. This output signal also goes to the remote recording or indicating station.

The feedback bellows assembly applies a force to lever 22 to produce a downward force $F_3$ at floating pivot 18, which force depends on the lever ratio $c/d$. The value $c$ is the distance between the fixed pivot 23 and the point on the short arm of lever 22 at which the bellows is connected thereto, the value $d$ being the distance between pivot 23 and the end of the long arm of the lever connected to rebalance strip 21

In order for the beam system to be in equilibrium, all forces at the vector mechanism must be balanced. As shown in FIG. 2, force $F_2$ represents the horizontally directed force applied by the force bar to the balanceable member 17, force $F_3$ is the downwardly directed rebalancing feedback force applied to floating pivot 18 by rebalance strip 21, while force $F_4$ is the resultant force established along reaction element 20 extending between the floating pivot and the ground point 19.

By adjusting the ground point, one can vary the angle $\theta$ between reaction element 20 and balanceable member 17 to bring about a continuous vernier range change. It can be shown on the vector diagram that by varying angle $\theta$, various levels of input force can be balanced with a constant feedback force $F_3$ to afford a fine span adjustment.

For example, a force level of 2.5 lbs. ($F_2$) can be rebalanced with a force of 0.5 lbs. ($F_3$) when the resultant angle $\theta$ equals $11° 19'$. Or a force level of 10.0 lbs. ($F_2$) can be rebalanced with the same $F_3$ force of 0.5 lbs. when the resultant angle $\theta$ is $2° 52'$.

Otherwise stated, when angle $\theta$ is reduced, the magnitude of input force can be increased proportionately for a given rebalance force thereby increasing the range of the instrument. The range can be varied in this fashion by a factor of about 2.5 to 1. However, large changes in range can only be effected by making substantial step changes in the force developed by the feedback bellows assembly.

This is accomplished by the novel bellows assembly 24 in which a bellows $A_1$ of relatively small capacity is concentrically nested within a larger bellows $A_2$, the two bellows being operatively linked to lever 22. The interior of inner bellows $A_1$ is coupled by pipe 30 to fixed port 31 of the selector switch 29, while the interior of bellows $A_2$ is coupled by pipe 32 to a second fixed port 33. These ports are separately or concurrently brought into communication with an inlet duct 34 connected to the pneumatic signal output of relay 27 by a pivoted fluidic link member LM having a first link section 35 and a second link section 36 angularly displaced from the first section.

The first link section 35 has a narrow head portion 35A adapted to engage either port 31 or 33, whereas the second link section 36 has a broader head portion 36A dimensioned to bridge both ports so that the feedback pressure is then applied through pipes 30 and 32 to both the inner and outer bellows $A_1$ and $A_2$.

In practice, a selector switch 29, may be of the rotary gasket type or of the type in which a sandwich type gasket is positioned between plates or flanges.

The various angular positions of link member LM are indicated by the marking "Both", "Inside" and "Outside." At the Both position, head 36A of link section 36 engages ports 31 and 33 to feed the fluid from the relay 27 to both bellows $A_1$ and $A_2$. At the Inside position, only link section 35 is connected with port 31 to feed the fluid into the inner bellows $A_1$. Finally, at the Outside position, link section 35 engages port 33 to feed the fluid into bellows $A_2$.

By selecting which bellows or combination thereof is pressurized, three different levels of feedback force $F_3$ are available to provide a large step adjustment. These three levels are determined as follows:

$$Fdbk_1 = P(A_1)$$

$$Fdbk_2 = P(A_2 - A_1)$$

$$Fdbk_3 = P(A_2)$$

The arrangement disclosed herein is capable of measuring a wide range of pressure spans without using a large massive beam system, thereby improving vibration response. It also provides a closed loop system with no frictional contacts of the force carrying members. It is to be understood that while the bellow assembly has been illustrated as it operates in conjunction with a vector mechanism, it can be used in conjunction with any force producing system requiring step changes in the force developed by the bellows.

While there have been shown and described preferred embodiments of a pneumatic force-balance transmitter, it will be appreciated that many changes and modifications may be made therein without, however, departing from the essential spirit of the invention.

I claim:

1. A pneumatic force balance transmitter for producing an output signal proportional to the rate of flow in a line comprising:
    a. a pivoted force bar;
    b. means coupled to said line to produce an input force proportional to flow rate and to apply said input force to the lower end of said bar to develop a torque about its fulcrum;
    c. a negative feedback loop to develop a rebalance force and to apply it to the upper end of said bar to produce a rebalance torque tending to hold the bar motionless; said loop including a detector to sense any change in force bar position, means coupled to said detector to produce a pneumatic output signal proportional to said flow rate, a bellows assembly, means to apply said output signal to said assembly to produce a feedback force, and means to apply said feedback force to said force bar in opposition to the input force, said bellows assembly being adapted to produce large changes in the range of said transmitter and including a first bellows nested within a larger bellows and means to selectively supply the output signal to either bellows or to both whereby the force produced by the assembly can be selectively changed by applying the output signal to either bellows or to both.

2. A transmitter as set forth in claim 1, wherein said means to produce an input force is constituted by a capsule having a pair of pressure chambers coupled to upstream and downstream points on said line, said chambers having interlinked diaphragms to produce a force depending on the difference in pressure between said points, said interlinked diaphragms being coupled to the lower end of said bar.

3. A transmitter as set forth in claim 1, wherein said feedback force is applied downwardly to the floating pivot at the end of a balanceable member whose other end is connected to the upper end of said bar, said floating pivot being connected to a reaction element extending at an angle to said balanceable member to a ground point.

4. A transmitter as set forth in claim 3, wherein said feedback force is applied by means of an L-shaped lever coupled to said bellows assembly, the short arm of said lever being connected to said assembly, the long arm thereof being connected to said floating pivot by a flexible strip.

5. A transmitter as set forth in claim 3 further including means to adjust the position of said ground point to vary the angle between said reaction element and said balanceable member, thereby to effect vernier changes in the range of the transmitter.

6. A transmitter as set forth in claim 1, wherein said detector is constituted by a flapper and nozzle arrangement, the position of the flapper relative to said nozzle being shifted by said feedback force.

7. A transmitter as set forth in claim 6, wherein said means coupled to said detector to produce an output signal is constituted by a fluidic amplifying relay.

8. A transmitter as set forth in claim 1, wherein said means to selectively supply comprises a selector switch which is adapted in one position to apply the output signal to the larger of said bellows, in a second position to apply the output signal to the smaller bellows, and in a third position to both said bellows.

* * * * *